United States Patent [19]

Sullivan

[11] Patent Number: 4,924,552
[45] Date of Patent: May 15, 1990

[54] NET RUCKER

[75] Inventor: Michael J. Sullivan, Rochester Hills, Mich.

[73] Assignee: The Brechteen Company, Mt. Clemens, Mich.

[21] Appl. No.: 374,266

[22] Filed: Jun. 30, 1989

[51] Int. Cl.$^5$ .............................................. A22C 21/00
[52] U.S. Cl. ........................................ 17/1 R; 17/35; 17/49; 138/118.1; 206/802
[58] Field of Search .................... 17/35, 49, 33, 36, 41, 17/1 R; 206/802; 426/105; 138/118.1

[56] References Cited

U.S. PATENT DOCUMENTS

| 2,001,461 | 5/1935 | Hewitt | 17/49 |
| 2,698,961 | 1/1955 | Cross | 17/49 |
| 4,133,164 | 1/1979 | Mintz | 17/41 |
| 4,150,521 | 4/1979 | Reilly | 17/39 |
| 4,467,499 | 8/1984 | Beckman et al. | 17/49 |
| 4,470,171 | 9/1984 | Rusmussen et al. | 17/49 |

OTHER PUBLICATIONS

Net Rucker information from C & K Manufacturing & Sales Company, 4 pp., undated.

Primary Examiner—Willis Little
Attorney, Agent, or Firm—Harness, Dickey & Pierce

[57] ABSTRACT

Apparatus for shirring food stuffing netting onto a temporary carrier sleeve. An empty sleeve is placed on a platform and an end of the tubular netting is slid over the sleeve. The platform is raised between a pair of rucking wheels which are rotated to pull the netting from a roll thereof and shirr it onto the sleeve in a fast, dense and essentially noise-free manner.

15 Claims, 3 Drawing Sheets

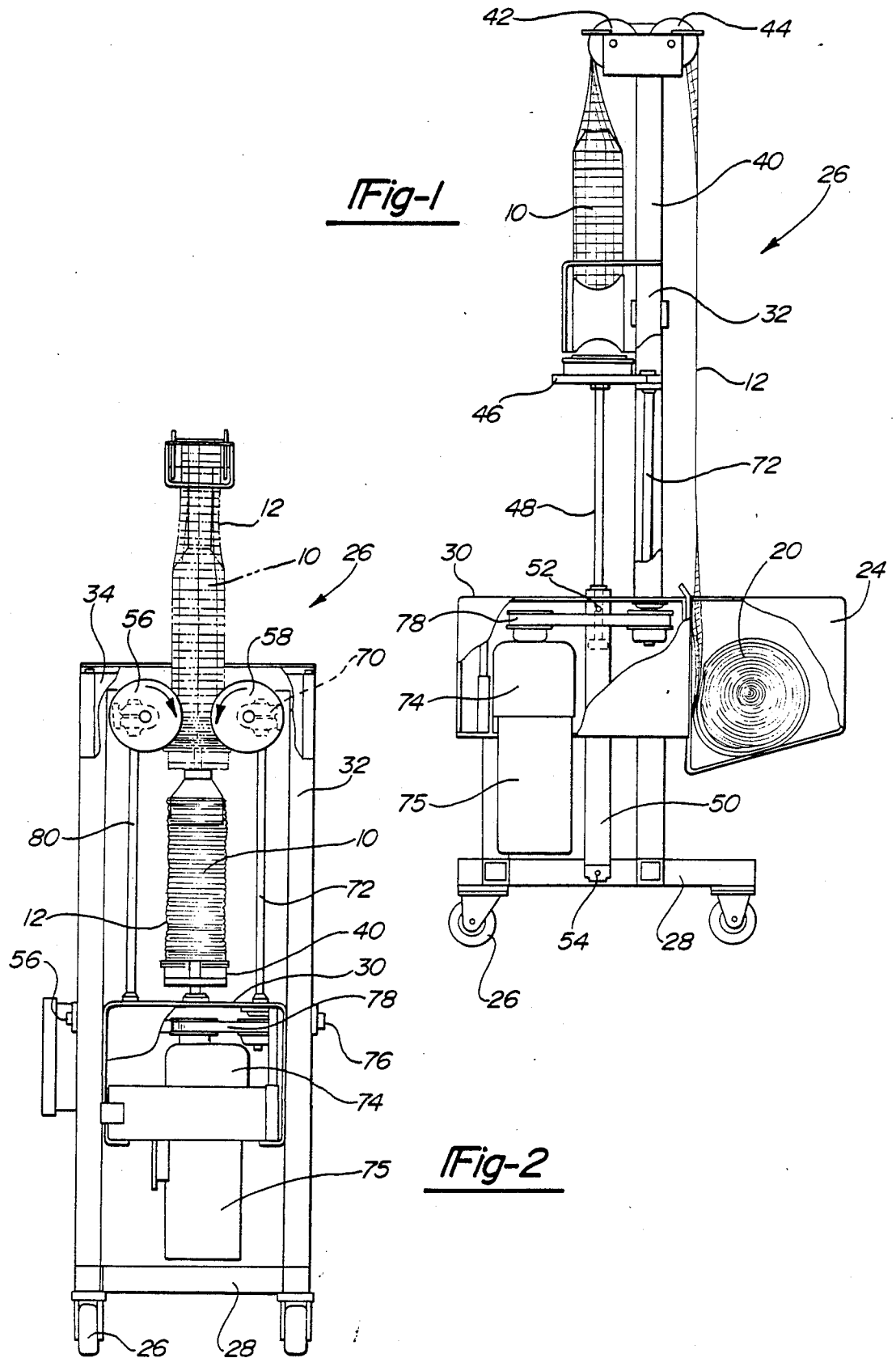

NET RUCKER

BACKGROUND OF THE INVENTION

1. Technical Field

This invention relates to food processing equipment and, more particularly, to a net rucker for shirring tubular netting onto a temporary carrier in the form of a tube or sleeve.

2. Discussion

Tubular netting is often used to hold together pieces of meat when making hams, loaves and the like. Typically, the netting is placed over an end of a stuffing horn and the meat products are forced into the netting through the chute of the horn. The netting is then removed from the horn and clipped around the stuffed meat product. The netted meat product then is typically smoked or further processed as desired.

The netting is available from a variety of manufacturers such as, without limitation, from C & K Manufacturing and Sales Company of Bay Village, Ohio under the trademark ZIP-NET. The netting often comes in flattened rolls which require that the netting be unrolled and spread apart prior to use. Some automated meat stuffing machines are designed for use with a tube or sleeve that has a quantity of netting gathered or shirred onto it. The sleeve acts as a temporary carrier for the netting. In operation, the machine forces the meat products into a closed end of the netting in a manner which feeds a portion of the netting from the sleeve. The other end of the meat product is surrounded by the netting which is then clipped and cut. A sufficient quantity of netting is shirred onto the sleeve so that several stuffing operations can be performed before having to replace the sleeve.

The present invention is primarily concerned with the way in which the netting is shirred onto the sleeve. The aforementioned C & K Manufacturing and Sales Company has sold what is know in the trade as a "net rucker" for shirring the netting onto the sleeve. Unfortunately, this machine is relatively noisy and slow. It employs a plurality of spring loaded fingers which carry the netting downwardly over the sleeve as it reciprocates up and down. During the upward stroke of the sleeve, the fingers engage the cross bars of the netting and push it downwardly. During the downward stroke of the sleeve, the fingers slide over the netting cross bars until the fingers reached the top of the sleeve ready to repeat the action during the next downward stroke of the sleeve. This prior art machine creates a relatively significant amount of noise during operation thereby disturbing workers in the plant environment. It also is relatively slow thereby leading to manufacturing inefficiencies. Furthermore, the density of the netting on the sleeve is not as dense as it could be, thereby leading to the need to often replace the sleeve during the meat shirring operation.

SUMMARY OF THE INVENTION

In accordance with the teachings of the present invention apparatus for shirring netting onto a sleeve employs a pair of rucking wheels that rotate in opposite directions to engage the netting after it is initially pulled over the sleeve. The wheels rotate in opposite direction and have sufficient friction so as to shirr the netting onto the sleeve in a quick, dense and quiet manner.

BRIEF DESCRIPTION OF THE DRAWINGS

The various advantages of the present invention will become apparent to those skilled in the art after having the benefit of reading the following specification and by reference to the drawings in which:

FIG. 1 is a side view of a net rucker machine made in accordance with the teachings of this invention, the sleeve being shown in an uppermost position during an initial stage in the shirring operation;

FIG. 2 is a front view of the machine showing the sleeve in phantom lines in the same position as in FIG. 1, with the sleeve in solid lines being shown with the netting being fully shirred onto the sleeve and the platform lowered to its lowermost position;

DESCRIPTION OF THE PREFERRED EMBODIMENT

Figure 6:
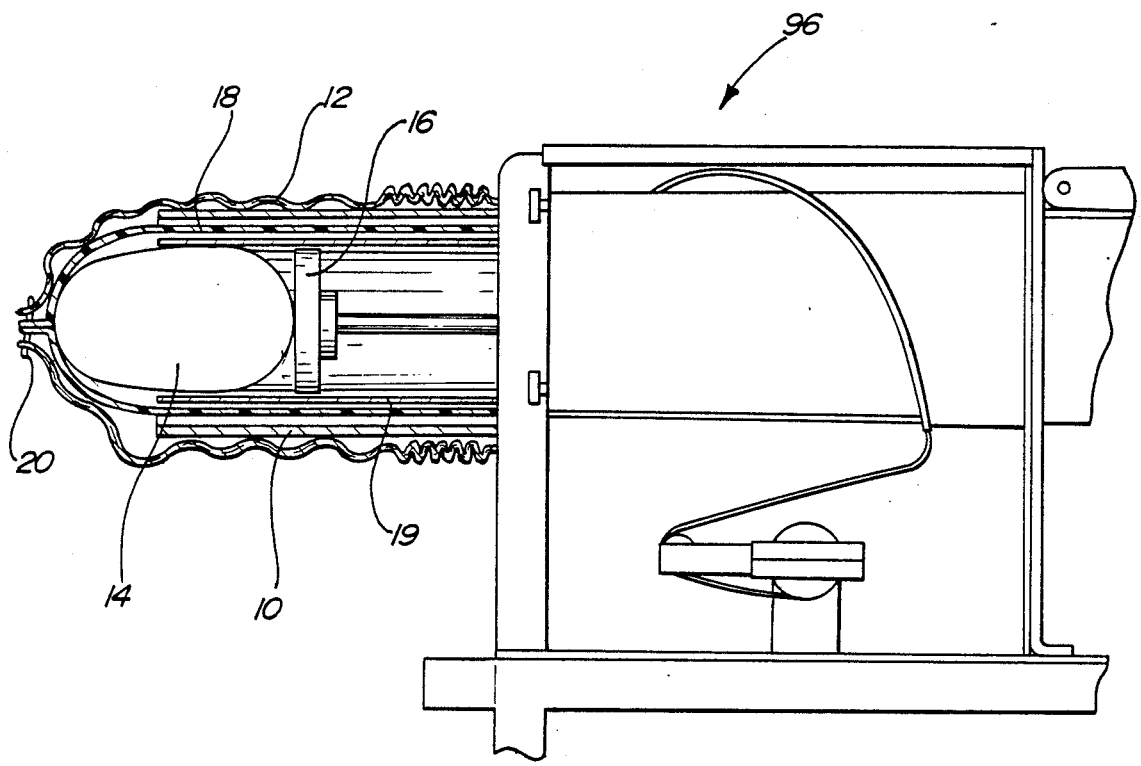
FIG. 6 is a side view with parts in cross section illustrating a typical use of the net sleeve in a meat stuffing machine.

As alluded to earlier, the method and apparatus of the present invention are concerned with providing a net tube or sleeve having netting shirred onto it. FIG. 6 shows an example of the meat stuffing machine which uses the net sleeve 10 with the netting 12 shirred onto it. Various food stuffs 14 are forced or pushed through an internal chute or horn 19, for example, by way of piston 16. In this particular example, the food stuffing machine also simultaneously wraps the food stuff 14 with an edible collagen film 18 such as COFFI film available from The Brechteen Company, the assignee of the present invention. The forward ends of the netting 12 and film 18 are clipped together as shown at 20. Thus, the netting 12/film 18 combination form a bag or pouch for receiving the food stuff 14. At the end of the stroke of the piston 16 the food stuff 14 has substantially exited from the end of the horn 19. Then, the user gathers the netting around the rearward end of the food stuff, cuts the netting and film, and then clips the rearward end of the product to form a completed flexible netted bag for the food stuff. During this operation only a limited portion of the netting is fed from the sleeve. Accordingly, many different stuffing operations can be performed before it is necessary to replace the sleeve 10 with a new sleeve that is fully loaded with netting. As will appear, the present invention loads the netting onto the sleeve very densely so that it is not necessary to replace the sleeve as often as when loaded by the prior art techniques. With that background in mind, the reader's attention is now drawn to the method and apparatus for loading the net sleeve 10 with the netting 12.

Turning now to FIGS. 1–5, the netting 12 is supplied in the form of a roll 20 that has wound layers of flat, tubular netting thereon. The netting, as explained above, comes in various sizes and shapes and typically is in the form of a matrix of latex strands wrapped with cotton threads. The net roll 20 is mounted for rotation in a feeder compartment 24 of the net rucker machine of the present invention which is designated generally by the numeral 26. The machine 26 includes a tubular frame riding on casters 26 thereby providing it with easy portability. The frame includes a base 28, work surface 30 and a gantry 32 provided by a pair of side posts 32 which support a cross member guard 34 having a pair of side flanges 36, 38. A pair of guide rollers 42 and 44 are suitably mounted to the upper end of an upright post 40.

A platform 46 is provided for receiving the lower end of net sleeve 10. Platform 46 is connected to a piston rod 48 in an air cylinder 50. Vertical movement of platform 46 is controlled, in part, by a preselected amount of air pressure applied to ports 52 and 54. A control button 57 is provided to provide operator selection of up or down movement of the platform 46.

A pair of rucking wheels 56 and 58 are located above the platform 46 on opposite sides of the major axis of piston rod 48. Each of the wheels 56, 58 are substantially identical. Wheel 58 is shown in more detail in FIG. 3. It includes inner and outer aluminum flanges 60, 62 as well as an aluminum core 64. The wheel rotates about a shaft 66 through a one-way or overrunning clutch 68. Shaft 66 is driven through a right angle gear box 70 which in turn is coupled to a vertically oriented drive shaft 72. Drive shaft 72 is driven by a motor 74 beneath the work surface 30. Motor 74 is controlled by push button 76 (FIG. 2) and causes belt 78 to rotate shaft 72. Motor 74 includes a brake 75 which prevents the motor and thus drive belt 78 from reversing directions. Belt 78 is also coupled to a similar shaft 80 which is used to wheel 56 in a similar manner through the use of another right angle gear box. The right angle gear box used to drive wheel 56 is reverse-mounted with respect to gear box 70 so that it causes wheel 56 to rotate in an opposite direction than wheel 58.

Returning to FIG. 3, the engaging surface of the rucking wheels 56 and 58 are made of sufficiently high friction material to permit the surfaces to grip the netting 12 and pull it down over the sleeve 10, yet slick enough not to bind on the harder metal sleeve. Preferably, the engagement surface is provided by an elastomeric material such as a polyurethane annulus 82 that is relatively soft, in the neighborhood of 60 durometer. The engagement surface 84 is generally concave in cross section and is defined by an arc having about the same radius as the sleeve 10 so that the surface of the wheel substantially conforms to the sleeve. As will appear, it is preferable to have the engagement surface 84 contact as much of the netting 12 as possible, the netting being sandwiched between the sleeve 10 and the rucking wheel surface 84.

In operation, the operator places an empty sleeve 10 on the work surface 30 in front of platform 46 which is in its lowermost or home position. The upper end of sleeve 10 is fitted with a cap 86. The cap 86 is plugged into the upper end of the sleeve 10. Cap 86 has tapered surfaces that blend into the side walls of the sleeve 10 to thereby prevent the netting from catching on the otherwise sharp ends of the sleeve. The operator than threads the netting 12 from roll 20 over guide rollers 42, 44 and then spreads it apart and pulls it downwardly over cap 86 and onto the sleeve 10. Then, the sleeve 10 is placed onto and locked on the platform 46. The lower flange of the sleeve 10 is provided with one or more notches 88 which fit over lugs 90 on the platform. Then the sleeve 10 is twisted by the user thereby carrying the flange underneath a lip of the lugs 90 to lock the sleeve onto the platform 46.

After the sleeve is locked onto the platform 46, the operator presses button 57 causing the platform to raise to the position substantially shown in FIG. 1 (and in phantom lines in FIG. 2). The upward motion of platform 46 is generated by a preselected amount of air pressure applied to air cylinder port 54. In this preferred embodiment, approximately 30 psi pressure is applied to the cylinder port 54. This provides a controlled amount of back pressure to the platform 46 as will be discussed. During upward travel of platform 46 the netting becomes sandwiched between the wheels 56, 58 and the sleeve 10. The wheels 56, 58 contact the netting 12 and pull it downwardly towards the lower flange on the sleeve 10. The rucking wheels 56, 58 do not yet rotate due to the action of brake 75.

Figure 3:
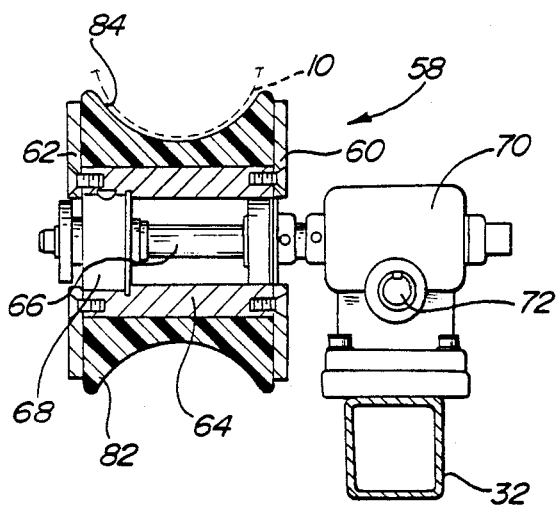
FIG. 3 is a cross-sectional view of a rucking wheel and its associated gearing arrangement.
Figure 4:
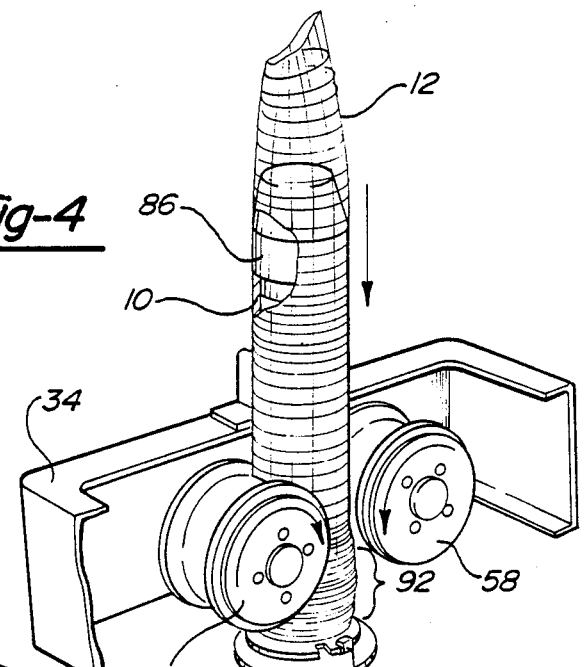
FIG. 4 is a perspective view of the machine during an initial step in the shirring operation.

Turning now especially to FIGS. 2 and 4, the operator now pushes button 76 to energize motor 74 and cause counter rotation of the wheels 56, 58 in the direction shown by the arrows in the figures. The rotation of the wheels 56, 58 pull the netting 12 from the roll 20 and force it downwardly onto the sleeve 10 in stacks of folded layers. This process is known in the art as shirring. The shirred layers are designated by the numeral 92 in FIG. 4. These layers 92 provide an increased diameter of material around the sleeve 10 which cause the wheels 58 to provide a downward force on the platform 46. The back pressure applied to the cylinder 50 is sufficiently weak to permit the platform to be pushed downwardly in a controlled manner to determine the density of the shirred netting.

Figure 5:
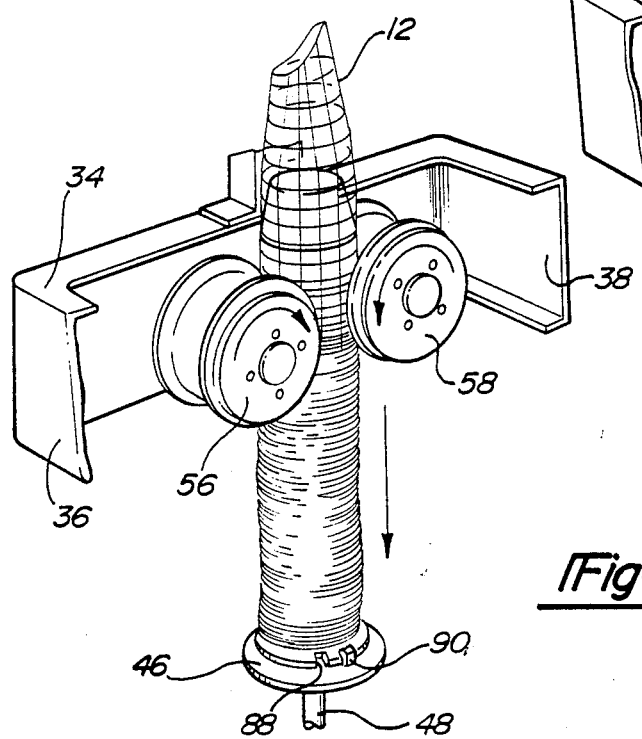
FIG. 5 is a perspective view similar to FIG. 4 taken at a subsequent time showing the netting being substantially fully shirred onto the sleeve.

If it becomes necessary to stop the process before the sleeve is filled, the operator releases button 76 and then releases button 56 to cause the platform 46 to move downwardly towards its home position. Although the wheels 56 and 58 are no longer driven, the one-way clutch 68 permits them to rotate as the sleeve 10 is moved downwardly. Normally, however, the shirring operation continues until the sleeve 10 is completely surrounded by shirred layers of netting 12 as shown in FIGS. 2 and 5. At that time, the netting 12 is cut above the cap 86 and pushed downwardly over the upper edges of sleeve 10. The cap 86 is removed and the sleeve 10 twisted to align the notches 88 with the lugs 90 to permit the filled sleeve to be lifted from the platform 46. The filled sleeve then can be transported to the meat stuffing machine 96 shown in and previously described in connection with FIG. 6.

Those skilled in the art will now come to appreciate some of the advantages of the present invention. The net rucker machine is very quiet since there are few moving parts which create noise. It is extremely fast. The rucking wheels 56, 58 are driven relatively fast (approximately 146 rpms) thereby speeding the operation. By way of a nonlimiting example, the machine can fill an 18 inch long 4 inch diameter sleeve with 75 feet of netting in about 30 seconds. This compares quite favorably to prior art techniques. In addition, the density of the shirred netting on the sleeve is considerably higher. As a result, it is not necessary to replace the sleeves on the meat stuffing machine 96 as often since there is more netting available for use per unit length of the sleeve 10. The skilled practitioner will realize still other advantages of the invention after having the benefit of studying the specification, drawings and following claims.

What is claimed is:

1. Apparatus for shirring food stuffing netting onto a temporary carrier sleeve, said apparatus comprising:

a movable platform for supporting the sleeve;

a plurality of rucking wheels;

guide means for initially guiding said netting between the wheels and onto the sleeve;

elevator means for raising the platform so that the wheels contact the netting on the sleeve; and drive means for rotating the wheels in opposite directions to pull the netting over an end of the sleeve and shirr it in multiple folded layers about the circumference of the sleeve.

2. The apparatus of claim 1 which further comprises:

feeder means containing a roll of flat netting; and wherein said drive wheels pull the netting from the roll thereof.

3. The apparatus of claim 1 which further comprises:

a temporary cap removably plugged into an end of the sleeve opposite the platform, said cap having tapered surfaces blending into side walls of the sleeve for preventing the netting from catching on the end of the tube.

4. The apparatus of claim 1 wherein said rucking wheels include nonmetallic engagement surfaces for contacting the netting on the sleeve.

5. The apparatus of claim 4 wherein said engagement surfaces are made of polyurethane of about 60 durometer.

6. The apparatus of claim 4 wherein said engagement surfaces are generally concave in cross section and generally conform to the shape of the sleeve.

7. The apparatus of claim 1 wherein said elevator means provides a predetermined amount of lift to the platform which is sufficiently weak to permit the platform to be pushed downwardly by the wheels as multiple folded layers of the netting are shirred onto the sleeve.

8. The apparatus of claim 7 wherein said elevator means comprises:

fluid actuated cylinder means having a piston rod connected to the platform, a predetermined amount of fluid pressure being applied to the cylinder to provide said predetermined amount of lift to the platform.

9. The apparatus of claim 1 which further comprises:

one-way clutch means for permitting rotation of the wheels in only one direction.

10. The apparatus of claim 1 wherein the drive means for each rucking wheel comprises:

a vertically oriented drive shaft having one end coupled to a gear box connected to a shaft for the wheel, an opposite end of the drive shaft being driven by a belt rotated by a motor.

11. The apparatus of claim 10 wherein the drive motor includes brake means for preventing rotation of the drive shaft in a direction opposite to the direction in which it rotates during driving of the wheels.

12. The apparatus of claim 11 which further comprises:

first operator control means for controlling vertical movement of the platform; and second operator control means for controlling energization of the motor and thereby the rotation of the wheels.

13. A method of shirring a tubular food stuffing netting onto a temporary carrier sleeve, said method comprising:

placing the sleeve onto a platform;

sliding an end of the netting over the sleeve;

moving the platform to carry the sleeve between a pair of rucking wheels which contact the netting; and rotating the wheels in opposite directions to shirr the netting onto the sleeve 14. The method of claim 13 which further comprises:

cutting the netting after it has been shirred onto the sleeve; and using the sleeve in a meat stuffing machine whereby the netting is used to encapsulate meat products.

15. The method of claim 14 wherein a predetermined amount of lift is applied to the platform during rotation of the wheels to control the density of the netting shirred onto the sleeve.

* * * * *